(12) United States Patent
Demont et al.

(10) Patent No.: US 11,962,147 B2
(45) Date of Patent: Apr. 16, 2024

(54) CIRCUIT AND SYSTEM FOR COUPLING BATTERY PACKS TO MOTOR CONTROLLER IN ELECTRIC OR HYBRID AIRCRAFT

(71) Applicant: H55 SA, Sion (CH)

(72) Inventors: Sébastien Demont, Saxonne (CH); Franco Summermatter, Sion (CH); David Glassey, Savièse (CH)

(73) Assignee: H55 SA, Sion (CH)

( * ) Notice: Subject to any disclaimer, the term of this patent is extended or adjusted under 35 U.S.C. 154(b) by 0 days.

(21) Appl. No.: 18/101,846

(22) Filed: Jan. 26, 2023

(65) Prior Publication Data

US 2023/0170693 A1 Jun. 1, 2023

Related U.S. Application Data

(63) Continuation-in-part of application No. PCT/IB2022/056994, filed on Jul. 28, 2022.

(30) Foreign Application Priority Data

Jul. 29, 2021 (CH) .............................. 20210070116

(51) Int. Cl.
*H02J 1/10* (2006.01)
*H02J 7/00* (2006.01)

(52) U.S. Cl.
CPC ............ *H02J 1/108* (2013.01); *H02J 7/0016* (2013.01); *H02J 7/0068* (2013.01); *H02J 2207/10* (2020.01)

(58) Field of Classification Search
CPC ........ H02J 1/108; H02J 7/0016; H02J 7/0068; H02J 2207/10
See application file for complete search history.

(56) References Cited

U.S. PATENT DOCUMENTS 5,760,570 A 6/1998 Nagai et al.
10,131,246 B2 11/2018 Demont
(Continued)

FOREIGN PATENT DOCUMENTS

DE 102013222462 7/2015
WO WO 2012/017697 2/2012

OTHER PUBLICATIONS

International Search Report for International Application No. PCT/IB2022/056994, dated Nov. 2022, in 4 pages.
(Continued)

*Primary Examiner* — Carlos Amaya
(74) *Attorney, Agent, or Firm* — Knobbe, Martens, Olson & Bear LLP

(57) ABSTRACT

The present disclosure describes at least a coupling circuit for powering an electric or hybrid aircraft with an output voltage. The couple circuit can include multiple connecting inputs, a charging interface, a connecting output, a high-power diodes arrangement, and a pre-charge circuit. The multiple connecting inputs can connect multiple battery packs. The charging interface can connect to a charger for charging the multiple battery packs. The connecting output can connect with a hardware controller. The high-power diodes arrangement can electrically connect to each respective connecting input and the charging interface. The high-power arrangement can include for each battery pack a first high-power diode and a second high-power diode. The pre-charge circuit can electrically connect to the high-power diode arrangement. The pre-charge circuit can include a first branch with a first switch, and a second branch in parallel with the first branch.

30 Claims, 8 Drawing Sheets

(56) References Cited

U.S. PATENT DOCUMENTS

| | | |
|---|---|---|
| 10,322,824 B1 | 6/2019 | Demont et al. |
| 10,479,223 B2 | 11/2019 | Demont |
| 10,576,843 B2 | 3/2020 | Demont et al. |
| 10,854,866 B2 | 12/2020 | Demont et al. |
| 11,059,386 B2 | 7/2021 | Demont et al. |
| 11,063,323 B2 | 7/2021 | Demont et al. |
| 11,065,979 B1 | 7/2021 | Demont |
| 11,148,819 B2 | 10/2021 | Demont et al. |
| 11,456,511 B2 | 9/2022 | Demont et al. |
| 2018/0287398 A1 | 10/2018 | Melack et al. |
| 2020/0052349 A1 | 2/2020 | Aikens |
| 2020/0231047 A1 | 7/2020 | Demont |
| 2020/0274368 A1* | 8/2020 | Crouse, Jr. ............ B60L 3/0092 |
| 2022/0069605 A1* | 3/2022 | Trela ........................ B60L 3/12 |

OTHER PUBLICATIONS

Written Opinion for International Application No. PCT/IB2022/056994, dated Nov. 2022, in 8 pages.

* cited by examiner

CIRCUIT AND SYSTEM FOR COUPLING BATTERY PACKS TO MOTOR CONTROLLER IN ELECTRIC OR HYBRID AIRCRAFT

RELATED APPLICATIONS

Any and all applications for which a domestic or foreign priority claim is identified in the Application Data Sheet of the present application are hereby incorporated by reference under 37 CFR 1.57.

FIELD

The present disclosure concerns a circuit, a system and a method for coupling a plurality of battery packs to a motor controller in an electric of hybrid aircraft.

BACKGROUND

Electric and hybrid vehicles have become increasingly significant for the transportation of people and goods. Such vehicles can desirably provide energy efficiency advantages over combustion-powered vehicles and may cause less air pollution than combustion-powered vehicles during operation.

Although the technology for electric and hybrid automobiles has significantly developed in recent years, many of the innovations that enabled a transition from combustion-powered to electric-powered automobiles unfortunately do not directly apply to the development of electric or hybrid aircraft. The functionality of automobiles and the functionality of aircraft are sufficiently different in many aspects so that many of the design elements for electric and hybrid aircraft must be uniquely developed separate from those of electric and hybrid automobiles.

Moreover, any changes to an aircraft's design, such as to enable electric or hybrid operation, also require careful development and testing to ensure safety and reliability. If an aircraft experiences a serious failure during flight, the potential loss and safety risk from the failure may be very high as the failure could cause a crash of the aircraft and pose a safety or property damage risk to passengers or cargo, as well as individuals or property on the ground.

The certification standards for electric or hybrid aircraft are further extremely stringent because of the risks posed by new aircraft designs. Designers of aircraft have struggled to find ways to meet the certification standards and bring new electric or hybrid aircraft designs to market.

In view of these challenges, attempts to make electric and hybrid aircraft commercially viable have been largely unsuccessful. New approaches for making and operating electric and hybrid aircraft thus continue to be desired.

Powering an electric or hybrid aircraft involves the use of high current flows from the battery packs to the motor controllers and the motors. Some flying phases, such as the take-off of the aircraft, require important amounts of current and therefore, the robustness of the electrical circuit used to power the motors is crucial to avoid technical problems that could potentially lead to major failures in the aircraft.

In order to attempt to mitigate potential problems associated with an aircraft, numerous organizations have developed certification standards for ensuring that aircraft designs and operations satisfy threshold safety requirements. The certification standards may be stringent and onerous when the degree of safety risk is high, and the certification standards may be easier and more flexible when the degree of safety risk is low.

Such certification standards have unfortunately had the effect of slowing commercial adoption and production of electric or hybrid aircraft. Electrical hybrid aircraft may, for example, utilize new aircraft designs relative to traditional aircraft designs to account for differences in operations of electric or hybrid aircraft versus traditional aircraft. The new designs however may be significantly different from the traditional aircraft designs. These differences may subject the new designs to extensive testing prior to certification. The need for extensive testing can take many resources, time and significantly drive up the ultimate cost of the aircraft.

SUMMARY

Electrical and hybrid aircrafts may include several battery packs that require to be charged. The recharging of battery packs may occur when the aircraft is on the ground by connecting the battery packs to a charging station. Additionally, the battery packs can be charged during the flight by using auxiliary power sources, for example from other battery packs and/or from the motors of the airplane acting as generator during landing or descent for example. For this reason, the powering system of such aircrafts may include a coupling circuit whose purpose is to couple the battery packs with the motor controller and with a charging station, so as to allow the battery packs to either power the motors of the aircraft or be charged.

As for the rest of the aircraft components, and especially the electrical components, each elements of the coupling circuit may be simple and robust in order to minimize the risk of technical failure and facilitate its certification.

Battery packs in electric or hybrid airplanes usually have a large capacity and can deliver high currents. To start the motors, the battery pack is connected to the motor controller through the coupling circuit so that the voltage at the inputs of the motor controllers increases suddenly. Since the motor controllers often includes large capacities between each inputs, and/or between each inputs and the ground, this fast change of voltage results in extremely high currents between the battery packs and the motor controllers. Those high currents can damage the battery cells, the coupling module, fuses, the motor controller and/or come cables between those components.

It is therefore an aim of the present disclosure to reduce this risk of damaging or overheating components when the system is started.

The pre-charge circuit is designed to prevent the high inrush current inherent to the powering up of the capacitors located in the motor controller from damaging the circuitry such as cables, fuses, battery packs relays or even battery cells. This pre-charge circuit acts as a robust resistor and temporarily lowers the current intensity so as to charge capacitors of the motor controllers while protecting the less robust circuitry.

Connecting several battery packs in parallel requires a protection circuitry to prevent uncontrolled loop currents when the open circuit voltages (OCV) of these battery packs are not equal, due to different battery state of charge. A conventional method uses a DC/DC converter, step up or step down, for connecting two or more battery packs in parallel to a set of capacitors. However, connecting at least two battery packs in parallel by using DC/DC converters for adapting their voltage levels requires complex electronic circuitries, and is therefore not reliable and difficult to certify.

Another problem of connecting several battery packs in parallel lies in the propagation of a potential dysfunction of a battery pack to another battery pack. For example, a shortcut in a battery pack may damage another battery pack if the two are directly connected.

There is therefore a need for a simplified, yet robust, circuit and system for an electric powered aircraft that simplify and streamline certifications requirements and reduce the cost and time required to produce a commercially viable electric aircraft.

Another aim of the present disclosure is to provide a coupling circuit for coupling battery packs to motor controller of electric or hybrid aircrafts that is better adapted to a large range of motor controllers.

According to an aspect, those aims are achieved with a coupling circuit for powering an electric or hybrid aircraft with an output voltage. The coupling circuit can include: a plurality of connecting inputs for connecting a plurality of battery packs to the coupling circuit; a charging interface for connecting the coupling circuit to a charger for charging the plurality of battery packs; at least one connecting output for connecting the coupling circuit with at least one motor controller; a high-power diodes arrangement electrically connected to each respective connecting input and electrically connected to the charging interface, the high-power arrangement comprising, for each battery pack of the plurality of battery packs, a first high-power diode and a second high-power diode, each first high-power diode being oriented to avoid a first current flowing from the associated battery pack to the charging interface, and each second high-power diode being oriented to avoid a second current flowing from the connecting output to the associated battery pack; and at least one pre-charge circuit electrically connected to the high-power diode arrangement, the pre-charge circuit comprising a first switch, a second switch and a resistor that is serially connected with said second switch.

This coupling circuit can have the advantages of being relatively simple, and not containing any programmable components, and therefore no monitoring system of such components, which facilitates its certification.

The pre-charge switch can prevent the high inrush current inherent to the powering up of capacitors located in the motor controller from damaging the other circuitry such as cables, fuses, battery packs relays or even battery cells. This pre-charge circuit can act as a robust resistor and temporarily lower the current intensity so as to charge capacitors of the motor controllers with a reduced current.

Moreover, the pre-charge circuit can prevent damage to the less robust circuitry, for example, when charging a battery pack with another battery pack in a situation when the two battery packs have a significant voltage differential. Indeed, the connection of a discharged battery pack with a fully charged battery pack may induce high currents due to the significant voltage difference.

The location of the pre-charge circuit in the coupling circuit can vary, but may be placed either between the high-power diodes arrangement and the connecting output, or between a connecting input and the high-power diodes arrangement.

The pre-charge switch can include a first switch, a second switch, and a resistor that is serially connected with the second switch. The switches can be alternatively open so that a current flows either through the first switch with almost no intensity loss, or through the resistor and the second switch with a significant drop in the current intensity so as to preserve the capacitors of the motor controller connected to the coupling circuit.

The coupling circuit may thus be arranged so that the motor controller is powered by a single battery pack (rather than multiple battery packs in other instances), i.e., the battery pack which presents the highest open circuit voltage, when the circuit output voltage is higher than the open circuit voltage of each of the other battery packs.

The motor controller can be powered by more than one battery pack, for example, by two or three battery packs, in parallel, when the open circuit voltage of those more than one battery pack is higher than the circuit output voltage.

This can allow for an automatic equalization of the charge between battery packs. If a battery pack has a higher open circuit voltage than the remaining battery packs, then this battery pack may deliver all the current required by the motor controller, until the circuit output voltage drops to a point that the diode connecting to the connecting output becomes conductive.

This can allow for an automatic equalization of the recharging of the battery packs. When a charger is connected to the charging interface, the battery pack having a voltage lower than the charger voltage (the single battery pack) may be recharged. Indeed, if a battery pack has a voltage higher than the charger voltage, the corresponding diodes is non-conductive.

The circuit may include an activation switch between each battery pack and the high-power diodes arrangement, the activation switch being configured to activate or deactivate each battery pack.

Each activation switch can be a field effect transistor (FET) or a power contactor remotely controllable by an operator of the aircraft so that the operator (such as a pilot or co-pilot) can decide which battery pack is used to power the aircraft, or which battery pack is recharged by a charger connected to the charging interface.

The charging interface can allow charging of one or more battery packs of the plurality of battery packs during a flying phase of the aircraft. Low power consuming flying phases such as the descent or the landing are particularly well adapted to recharge the battery packs The circuit can include a bypass circuit connecting the charging interface to the connecting output and including a bypass switch and a bypass high-power diode avoiding a current to flow from the charging interface to the connecting output. The purpose of this bypass circuit may be to allow a current to flow from the motor controller (which may be from the motor) to the battery packs. Indeed, because of the high-power diodes arrangement, and more precisely, because of the second high-power diodes, the current may not and may be unable to flow directly to the battery packs.

The bypass circuit may further include a bypass resistor serially connected with the bypass high-power fuse. This resistor can reduce the current intensity, for example, in case of regenerative charging or energy transfer from one battery pack to another.

One or more battery packs can be charged using another battery pack.

One or more battery packs can be charged using one or more motors of the aircraft as power generators. The generated current will then flow through the bypass circuit and the charging interface to recharge the battery packs.

One or more battery packs can be charged using regenerative braking. The charging interface can by connected to a power generator that converts the energy dissipated during braking phases of the aircraft.

The charging interface can include an external charging port for charging the battery packs from an external charging station.

The first and second high-power diodes in the high-power diodes arrangement and the bypass fuse can have a nominal current rating between 50 A and 400 A, or between 120 A and 300 A.

These aims may be achieved with a powering system for powering an electric or hybrid aircraft. The powering system can include: at least one motor controller for controlling a motor of the aircraft; a plurality of battery packs for providing an output voltage to the motor controller; a charging interface for connecting the powering system to a charger for charging the plurality of battery packs; a high-power diodes arrangement electrically connected to each respective battery pack and electrically connected to the charging interface and electrically connected to the motor controller, the high-power arrangement comprising, for each battery pack of said plurality of battery packs, a first high-power diode and a second high-power diode, each first high-power diode being oriented to avoid a first current flowing from the associated battery pack to the charging interface, and each second high-power diode being oriented to avoid a second current flowing from the connecting output to the associated battery pack; and at least one pre-charge circuit comprising a first branch with a first switch, and a second branch in parallel with said first branch, said second branch comprising a second switch and a resistor that is serially connected with said second switch.

The at least one pre-charge circuit can electrically connect the high-power diodes arrangement with the motor controller.

The at least one pre-charge circuit can electrically connect the high-power diodes arrangement with a battery pack.

The at least one pre-charge circuit can be disposed in a battery pack.

The powering system may include an activation switch between each battery pack and said high-power diodes arrangement, for electrically connecting/disconnecting each battery pack with the high-power diodes arrangement.

The powering system may include a bypass circuit electrically connecting the charging interface to the motor controller, a bypass switch, and a bypass high-power fuse, the bypass circuit being configured to allow a current to flow from the motor controller to the charging interface.

The bypass circuit may include a bypass resistor serially connected with the bypass high-power fuse. This resistor can reduce the charging current intensity, for example, in case of regenerative charging or energy transfer from one battery pack to another.

The bypass circuit can be arranged to allow a current to flow from the motor controller up to a battery pack so that the battery pack can be charged from the motor controller.

The bypass circuit can allow a current to flow from a first battery pack up to a battery pack so that the second battery pack can be charged from the first battery pack.

The high-power diodes arrangement can allow a current to flow from the charging interface to a battery pack, so that the battery pack can be charged with a power source connected to the charging interface.

The power source may be a regenerative braking device and/or an external charging station and/or a range extender and/or fuel cells and/or solar panels.

Each respective activation switch can be a field effect transistor (FET) or a power contactor remotely controllable by an operator or a computer in the aircraft.

Each first and second high-power diode in the high-power diodes arrangement can have a nominal current rating between 50 A and 400 A, or between 120 A and 300 A.

The plurality of battery packs can include battery packs of different voltages.

The battery packs of different voltages can include at least one battery pack providing a high power over a short period of time for take-off and at least one battery pack providing a lower power over a longer period of time for cruising.

According to one aspect, a coupling circuit for powering an electric or hybrid aircraft with an output voltage. The coupling circuit can include: at least one connecting input for connecting at least one battery pack to said circuit; at least one connecting output for connecting the circuit with at least one motor controller; and at least one pre-charge circuit comprising a first branch with a first switch, and a second branch in parallel with said first branch, said second branch comprising a second switch and a resistor that is serially connected with said second switch.

This disclosure also relates to a method for powering up an electric motor in an electric or hybrid aircraft that includes such a powering system. The method can include: during a pre-charge interval, powering said motor through said second branch of the pre-charge circuit; and after pre-charge, closing said first switch so as to power said motor through said first branch of the pre-charge circuit.

The closing of the first switch can be triggered manually by a pilot of the aircraft.

Closing of the first switch before a predetermined delay or before sufficient pre-charge of capacitors of the motor controller can be prevented by an electronic control circuit.

The closing of the first switch can be triggered automatically by an electronic control circuit, for example, after a delay or when a sufficient pre-charge of the input capacitors of the motor controller has been detected.

BRIEF DESCRIPTION OF THE DRAWINGS

Exemplar embodiments of the disclosure are disclosed in the description and illustrated by the drawings.

DETAILED DESCRIPTION

Figure 1:
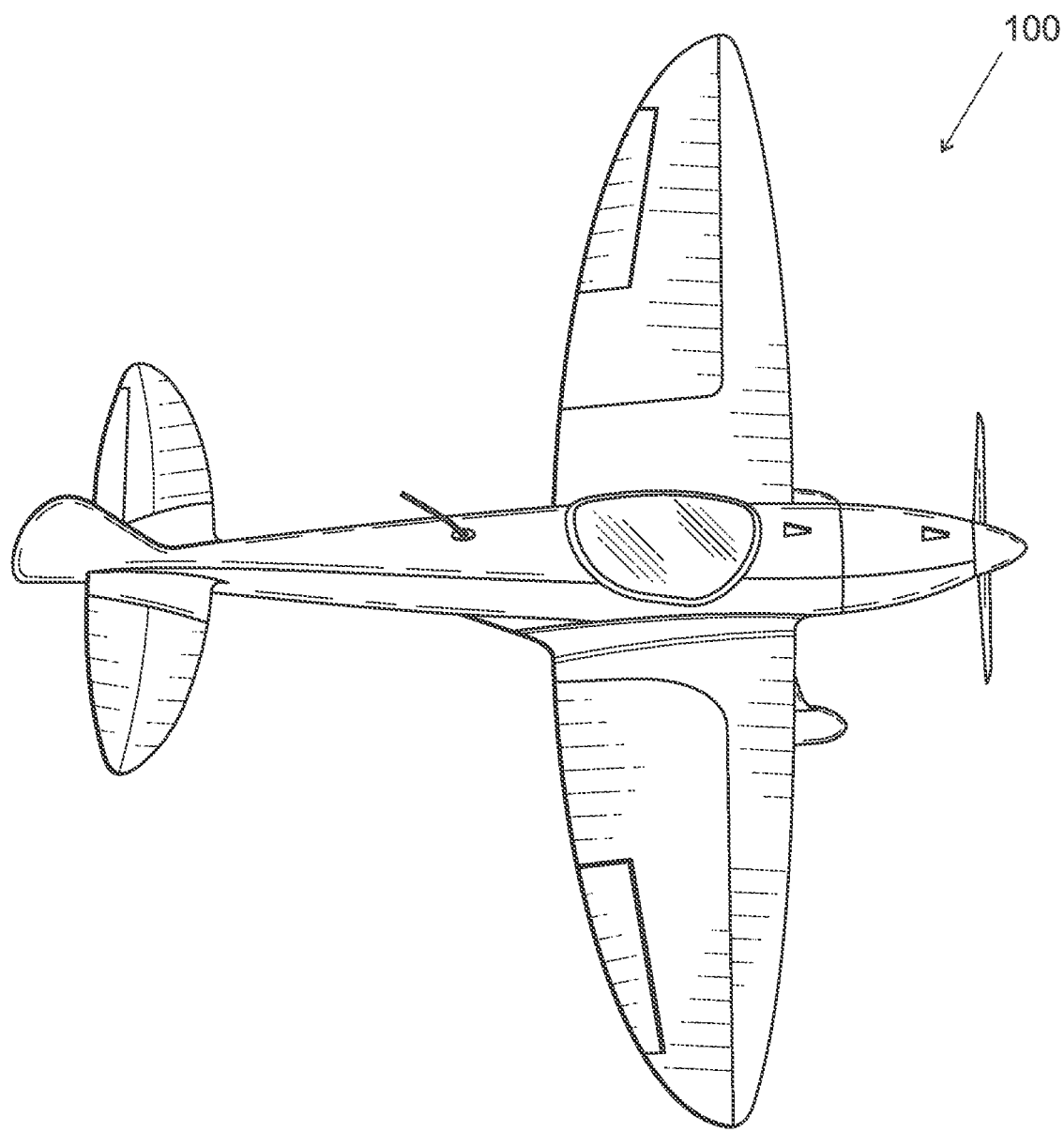
FIG. 1 illustrates an aircraft, such as an electric or hybrid aircraft.
Figure 2:
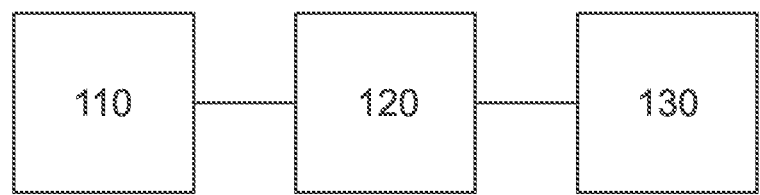
FIG. 2 illustrates a simplified block diagram of an electric or hybrid aircraft.

FIG. 1 illustrates an aircraft 100, such as an electric or hybrid aircraft, and FIG. 2 illustrates a simplified block diagram of the aircraft 100. The aircraft 100 includes a power source 110, a motor controller 120, and motor 130. The motor 130 can be used to propel the aircraft 100 and cause the aircraft 100 to fly and navigate. The motor 130 can include multiple motors in some implementations. The motor controller 120 can be a hardware controller and control and monitor the motor 130. The power source 110 can power the motor 130 to drive the aircraft 100 and power the motor controller 120 to enable operations of the motor controller 120. The aircraft 100 may include one or more controllers like the motor controller 120, as well as other electronic circuitry for controlling and monitoring the components of the aircraft 100.

Figure 4:
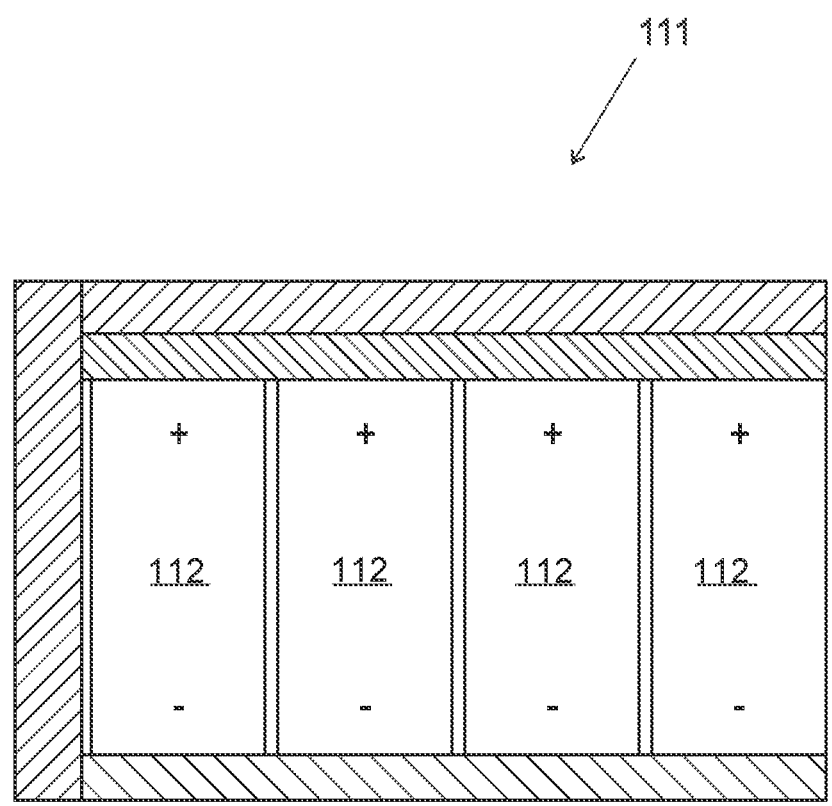
FIG. 4 illustrates a battery pack including several battery cells.

The power source 110 can store electrical energy and include one or more battery packs 111 that each include one or more battery cells 112, as shown in FIG. 4. The battery cells of a battery pack may be electrically connected in series or parallel with one another to deliver a desired voltage and current from the battery pack. Two or more battery packs can be electrically connected in series or in parallel to deliver a desired voltage and current from the two or more battery packs. The battery cells can be for example lithium-ion (Li-Ion), lithium-polymer (Li-Po), zinc-air, lithium-air, lithium-sulfur (Li—S) or solid state battery cells. Other types of battery cells can also be considered. The battery packs can be distributed over the aircraft for example over its wings and its nose.

Figure 3:
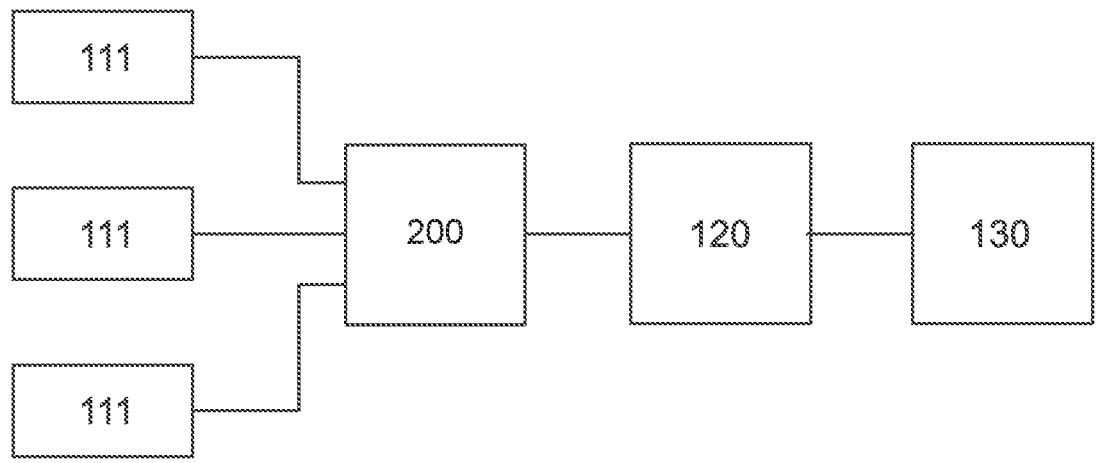
FIG. 3 illustrates a detailed block diagram of an electric or hybrid aircraft.
Figure 5:
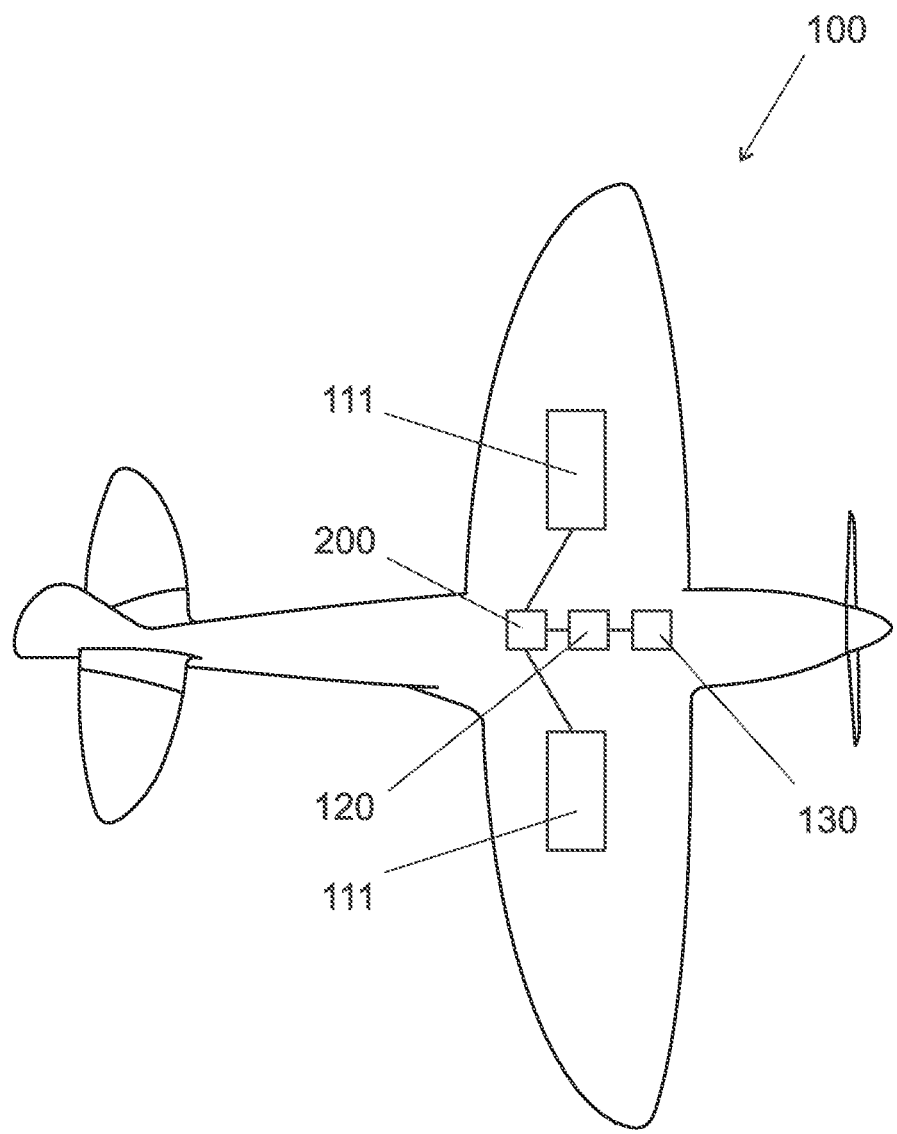
FIG. 5 illustrates an electrical or hybrid aircraft with a simplified powering system.

As illustrated in FIGS. 3 and 5, the battery packs 111 can be coupled and connected to the motor controller 120 via a coupling circuit 200. The coupling circuit can manage which battery pack is powering the motor 130 and/or the motor controller 120, as well as other features such as the possible regeneration of one or more of the battery packs 111. In general, the battery pack having the highest voltage may power the motor controller 120 and/or the motor 130 of the aircraft 100. In case two of the battery packs 111 have the same voltage, they may operate simultaneously as power source for the aircraft 100.

The battery packs 111 can be chosen to fulfil the electrical requirements for various flight modes. During short time periods like take off, the motor 130 can utilize a relatively high power. During most of the time, such as in the standard flight mode, the motor 130 can utilize a relatively lower power, but may consume a high energy for achieving long distances of travel. It can be difficult for a single battery to achieve these two power utilizations.

The use of two of the battery packs 111 with different power or energy characteristics can optimize the use of the stored energy for different flight conditions. For example, a first battery pack can be used for standard flight situations, where high power output may not be demanded, but a high energy output may be demanded. A second battery pack can be used, alone or in addition to the first battery pack, for flight situations with high power output demands, such as take-off maneuvering.

The power source 110 can also include a third of the battery packs 111, which includes a supercapacitor. Because supercapacitors can receive and output large instantaneous power or high energy in a short duration of time, the third battery pack can further improve the electrical powering system in some instances. A supercapacitor may, for example, have a capacitance of 0.1 F, 0.5 F, 1 F, 5 F, 10 F, 50 F, 100 F, or greater or within a range defined by one of the preceding capacitance values.

The connection of the battery packs 111 to the motor controller 120 can be realized through a coupling circuit 200. The battery packs 111 are connected in parallel to this coupling circuit 200 so as to power the motor controller 120 and the motor 130. The coupling circuit 200 can also be used to connect the battery packs 111 to a charger so as to recharge them.

Figure 6A:
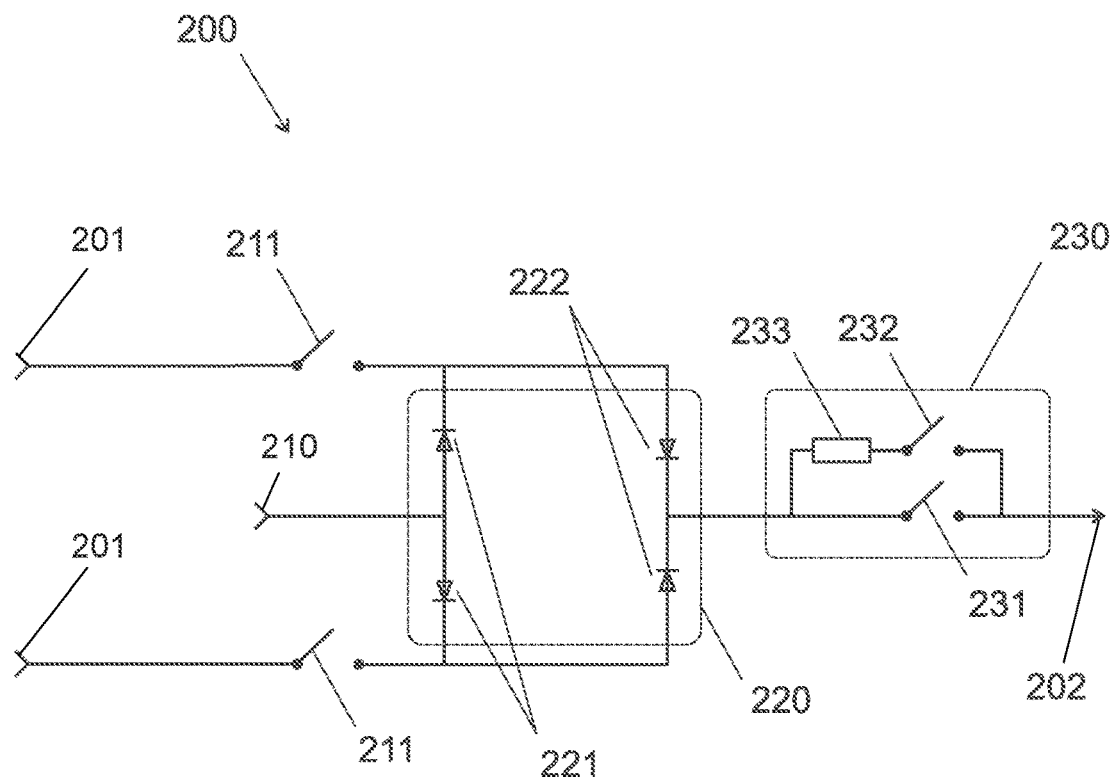
FIG. 6a illustrates a first embodiment of a coupling circuit of an electric or hybrid aircraft.

In the embodiment illustrated in FIG. 6a, the coupling circuit 200 includes at least two connecting inputs 201 for connecting at least two of the battery packs 111 to provide an input voltage to the coupling circuit 200, and at least one connecting output 202 for connecting the coupling circuit 200 to at least one motor controller. Each respective connecting input 201 is connected to a high-power diodes arrangement 220 including, for each connecting input, a first set of high-power diodes 221 and a second set of high-power diodes 222. The coupling circuit 200 includes a charging interface 210 electrically connected to the high-power diodes arrangement 220 and a pre-charge circuit 230, which electrically connects the high-power diodes arrangement 220 to the connecting output 202.

The high-power diodes arrangement 220 illustrated in FIG. 6a includes, for each respective battery pack, the first set of high-power diodes 221 that is disposed between the charging interface 210 and the respective battery pack, and the second set of high-power diodes 222 that is placed between the respective battery pack and the pre-charge circuit 230.

Each respective of the first set of high-power diodes 221 is oriented so as to prevent a current to flow from a battery pack connected to the corresponding connecting input 201 towards the charging interface 210, avoiding therefore a discharging of the battery pack through the charging interface 210. It can also prevent two or more of the battery packs 111 from being connected through the charging interface 210, in the sense that no current can flow from a battery pack into another battery pack via their connection to the charging interface 210.

The first set of high-power diodes 221 illustrated in FIG. 6a can be in a head to tail configuration, allowing the current to flow from the charging interface 210 to either one or the other of the battery packs 111 according to the respective voltage of each battery pack. This configuration ensures that the battery pack with the lowest voltage is charged first. This head to tail diode configuration can be extended in case of additional battery packs connected to the charging interface 210.

One purpose of the second set of high-power diodes 222 may be to prevent a battery pack connected to a connecting input 201 to discharge into another battery pack connected to another connecting input through their connection to the pre-charge circuit 230. Indeed, all of the battery packs 111 can be electrically connected to the pre-charge circuit 230, which can be itself connected to the motor controller 120, so that the current provided by a battery pack may not and may be unable to flow into another battery pack instead of powering motor controller 120 or motor 130.

Another purpose of the second set of high-power diodes 222 may be to avoid reverse powering of a potential electrical failure, such as a shortcut for example, in a battery pack to another battery pack.

In the embodiment illustrated in FIG. 6a, the second set of high-power diodes 222 are placed between the battery packs 111 and their connection with the pre-charge circuit 230. This configuration can ensure that the current provided by a battery pack can exclusively flow towards the pre-charge circuit 230 and not towards another battery pack.

In the present disclosure, the term "high-power diode" may refer to any type of diode having a high current capability. Indeed, the currents involved during phases such as the take-off of the aircraft can be relatively high. In general, the minimal current capability of the first and second sets of high-power diodes can be of at least 150 A. This high current capability may help to avoid safety issues and facilitate the certification of the coupling circuit 200.

The voltage loss in the diodes may not constitute an obstacle to their use as this loss may be comparatively small with respect to the voltages produced by the battery packs 111 in order to power the motor 130 of the aircraft 100. The voltage loss of high-power diodes usually stands between 1 V to 1.5 V, which is negligible in regard to voltages of several hundred Volts used to power the aircraft 100.

Figure 9:
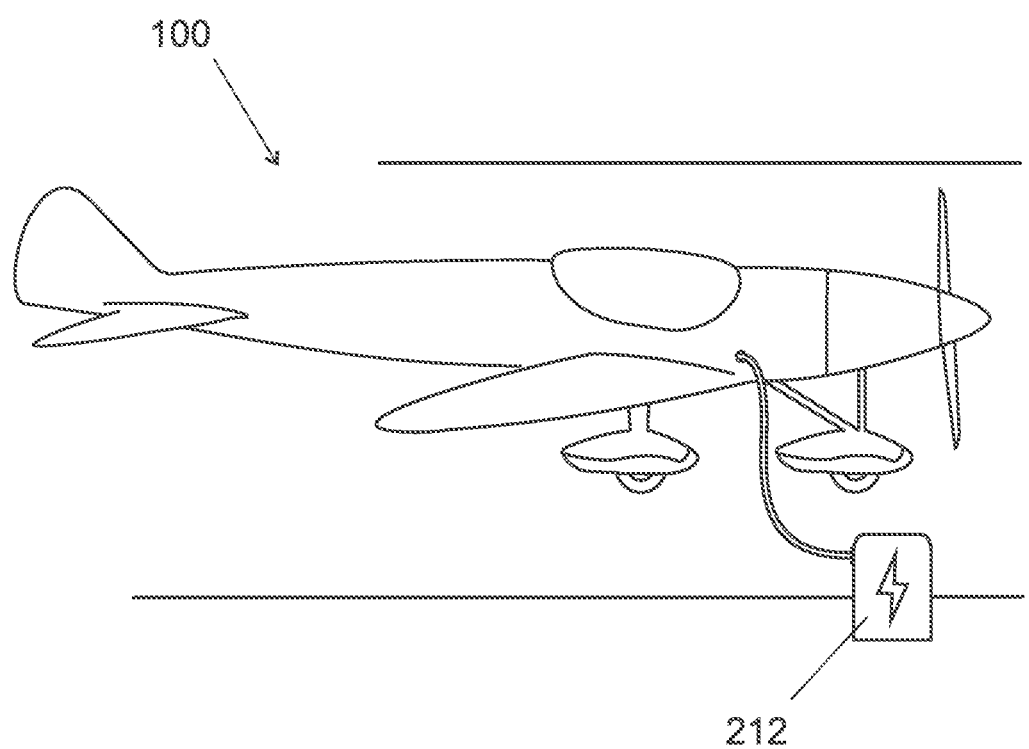
FIG. 9 illustrates an electric or hybrid aircraft on the ground connected to a charging station.

The charging interface 210 can be connected to a charger to charge one or more of the battery packs 111. This charging operation can be realized either during a flight period using an on-board power source or when the aircraft 100 is on the ground by means of an external power source, such as for example a charging station 212 as illustrated in FIG. 9.

On-board power sources used to charge a particular of the battery packs 111 can include, for example, other battery packs, the motor 130 of the aircraft 100 operating as generators, for example by using one or more propellers as windmills, aircraft brakes (regenerative braking) during the landing of the aircraft 100, or solar panels disposed on the aircraft 100. According to the autonomy requirements, the aircraft 100 may carry fuel cells and/or range extenders such as, for example, internal combustion engines.

As already mentioned above, the coupling circuit 200 can include at least one pre-charge circuit 230 configured to temporarily reduce the current intensity, for example, to protect less robust circuitry such as battery pack relays, cables and or fuses from the inrush high currents occurring when powering up the motor controller 120. The pre-charge circuit 230 may often be remote controlled.

The pre-charge circuit 230 may switch between three possible configurations. In a first configuration, the pre-charge circuit 230 can act as a closed switch, meaning that it allows a current to flow from a battery pack to the motor controller 120 without decreasing its intensity (apart from the internal resistance of the pre-charge circuit 230). In a second configuration, the pre-charge circuit 230 can act a resistor to reduce the intensity of the current that flows from the battery pack to the motor controller 120 through the pre-charge circuit 230. In a third configuration, the pre-charge circuit 230 can act as an open switch, meaning that no current can flow from a battery pack to the motor controller 120.

As illustrated in FIG. 6a, the pre-charge circuit 230 may include a branch with a first switch 231 and a second branch, parallelly connected to the first branch and including a second switch 232 and a resistor 233 serially connected to the second switch 232. The pre-charge circuit 230 can be electrically connected to the high-power diodes arrangement 220 at one end, and to the motor controller 120 at the other end via the connecting output 202.

In the first configuration of the pre-charge circuit 230, the first switch 231, which is not serially connected to the resistor 233, is closed, and the second switch 232, which is serially connected to the resistor 233, is open. In this first configuration of the pre-charge circuit 230, the totality of the voltage at the connecting input 201 in the pre-charge circuit 230 is applied to the connecting output 202 and to the motor controller 120 given the inner resistance of the circuit. This first configuration can be used, for example, in flight mode so that the maximum current and voltage provided by the battery packs 111 can be applied to the motor controller 120 of the aircraft 100 with marginal losses in the coupling circuit 200.

In the second configuration of the pre-charge circuit 230, the first switch 231 is open, and the second switch 232 is closed so that the current flowing through the pre-charge circuit 230 is decreased due to the resistor 233. This second configuration can be typically used to preserve the motor controller 120 from the high current inherent to the start of the motor 130. This second configuration can be used during a limited time when powering up the motor 130 of the aircraft 100, so as to temporarily reduce the currents during pre-charge of capacitors in the motor controller 120.

In the third configuration of the pre-charge circuit 230, both the first and the second switches (231,232) are open so that no current is able to flow through the pre-charge circuit 230. This third configuration can be used when the motor 130 of the aircraft 100 is stopped, to avoid any discharge of the battery packs 111 through resistive losses in the motor controller 120.

Figure 6B:
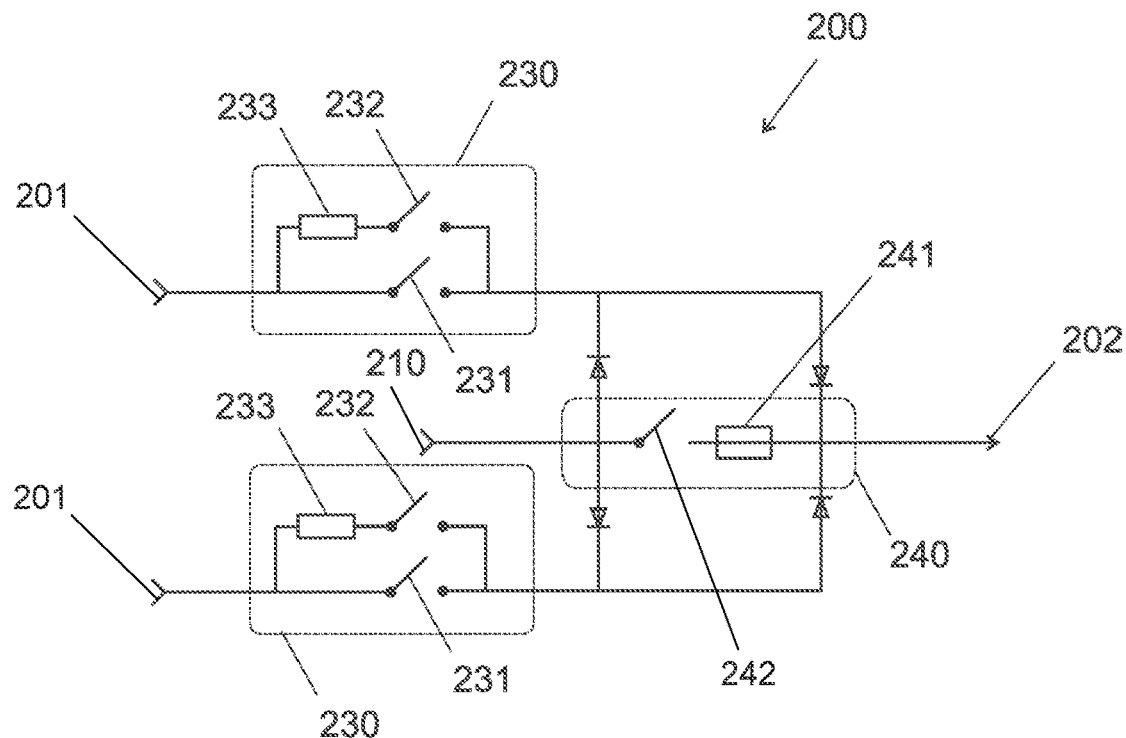
FIG. 6b illustrates a second embodiment of a coupling circuit of an electric or hybrid aircraft.

In another embodiment illustrated in FIG. 6b, the coupling circuit 200 is shown with two of the pre-charge circuit 230 disposed between the high-power diodes arrangement 220 and each respective connecting input 201. This allows a more refined management of the current intensity with respect to each particular battery pack.

As in the embodiment of FIG. 6a, each pre-charge circuit 230 may include a first branch with a first switch 231 and a second branch in parallel with the first branch, and including a second switch 232 and a resistor 233 serially connected to the second switch 232. Each pre-charge circuit 230 may therefore stand in the three configurations described above so that the pre-charge circuit 230 may act as a closed switch, as an open switch or as a resistor.

As illustrated in FIG. 6a, the coupling circuit 200 can include activation switches 211, namely one for each of the battery packs 111 connected to one of the connecting inputs 201, so as to manually or automatically connect the battery pack to the high-power diodes arrangement 220 or to disconnect it from the high-power diodes arrangement 220. These activation switches 211 can be, for example, field-effect transistors (FET) or power contactors that are remotely controllable from the cockpit of the aircraft 100 by an operator or by a computer in charge of the battery packs management. Other types of switches, remotely controllable or not, can be used.

If one of the activation switches 211 is opened, the corresponding battery pack 111 is isolated from the coupling circuit 200. Hence the battery pack cannot power the motor controller 120 nor be charged when the activation switch is open.

In the embodiment illustrated in FIG. 6b, the first and third configurations of each of the two pre-charge circuits 230 can have the same function as a standard switch (closed/open), this disposition of the pre-charge circuits 230 between a battery pack 111 and the high-power diodes arrangement 220 may replace the activation switches 211 mentioned above.

The first and second switches 231, 232 can be controlled by the pilot from the cockpit, and/or through an electronic control circuit (not shown). When the aircraft 100 is stopped, the first and second switches 231, 232 can be both open so that no current flows through the coupling circuit 200. Alternatively, or in addition, the battery packs 111 may be disconnected from the motor controller 120 through the activation switches 211.

When the motor 130 is started, in pre-charge mode, the second switches 232 may be closed so that a current can flow from the battery packs to the motor controller through the high-power diodes arrangement 220 and the second branch of the pre-charge circuit 230 but may not flow in the opposite direction. In this configuration, the current that flows may be reduced due to the relatively high value of the resistors 233. One thus prevents high currents to damage the motor controller 120 of other components when a voltage is suddenly applied to the capacitors at input of the motor controller 120.

The pre-charge circuit 230 then can switch to the flight mode (first configuration) by closing the first switches 231 and opening the second switches 232. In this configuration, the current at output of the high power diodes arrangement 220 flows directly to the motor controller 120.

The change from the pre-charge mode (second configuration) to the flight mode (first configuration) can be triggered by the pilot, for example, by entering a command on the cockpit. Alternatively, or in addition, this change can be performed by a digital and/or analog electronic control circuit that automatically performs this change after a predetermined delay, and/or after detection that the input capacitors of the motor controller 120 have been sufficiently charged, or that the current through the second branch has diminished to a predetermined value.

Alternatively, or in addition, a change to the first configuration can be prevented by a digital and/or analog electronic control circuit that prevents closing the first switch 231 directly from the third configuration, or before a predetermined delay in the second configuration, or before sufficient pre-charge of the input capacitors of the motor controller 120.

Because the high-power diodes arrangement 220 may allow the current to flow from the battery packs 111 to the connecting output 202 or from the charging interface 210 to a battery pack and not in the opposite directions, the coupling circuit 200 may include an additional bypass circuit 240 to allow a current to flow from the motor controller 120 or from another battery pack towards a particular battery pack that is to be charged. This additional bypass circuit 240 can be disposed between the charging interface 210 and the connecting output 202.

As illustrated in FIG. 6b, the bypass circuit 240 includes a high-power bypass fuse 241 and a bypass switch 242. When the bypass switch 242 is closed, the bypass circuit 240 allows a current to flow directly from the connecting output 202 or from a battery pack to the charging interface 210. When the bypass switch 242 is open, no current can flow from the connecting output 202 or from a battery pack to the charging interface 210.

Figure 7:
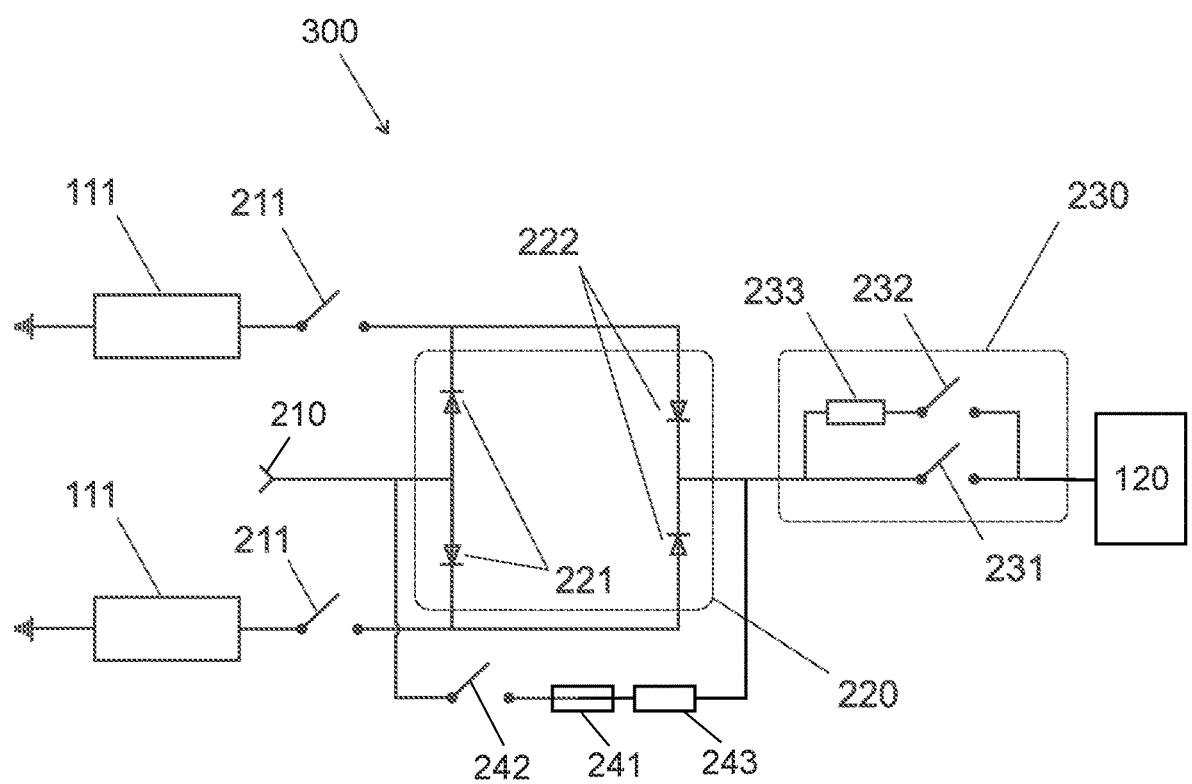
FIG. 7 illustrates a powering system of an electric or hybrid aircraft.
Figure 8:
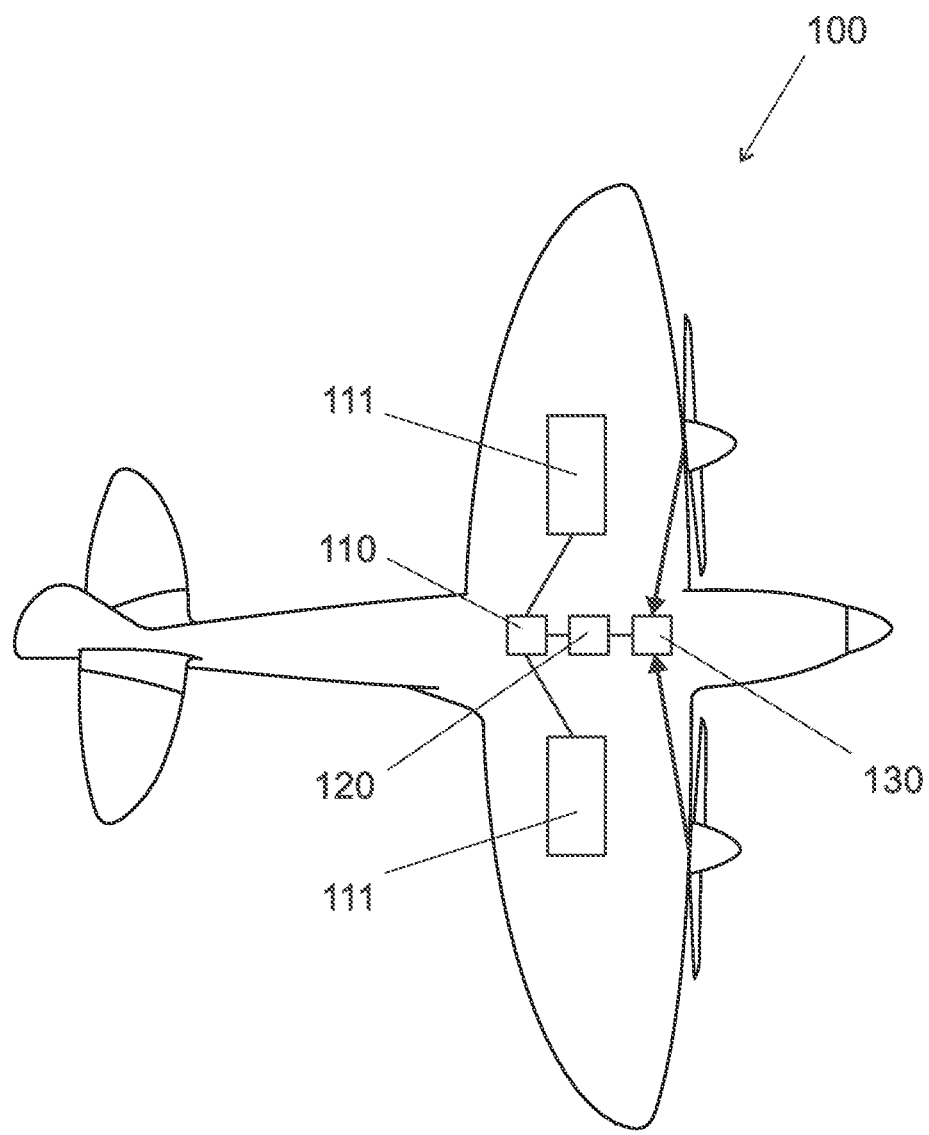
FIG. 8 illustrates an electrical or hybrid aircraft with propellers operating as a windmills to recharge the battery packs.

As illustrated in FIG. 7, the bypass circuit 240 may include a bypass resistor 243 which is serially connected with the bypass fuse 241, and which acts as a charge current limiter. The bypass resistor 243 can reduce the current intensity, for example, during regenerative charging or when charging battery pack with another battery pack. In such situations, the voltage differential between the discharged battery pack and the power source may create high-current inrush when they are connected, so that a resistor can prevent these high-currents from damaging fragile circuit elements.

The bypass switch 242 can be a remotely controlled switch so that an operator or a computer may open or close at will. If desired, the bypass switch 242 may be manually controlled.

In a particular embodiment, the bypass circuit 240 can be used to charge a second battery pack from a first battery pack having a higher voltage than the second battery pack. Indeed, by closing the bypass switch 242 and the activation switches 211 corresponding to the two of the battery packs 111, a current can first flow from the first battery pack through the high-power diodes arrangement 220 and then through the bypass circuit 240 to the charging interface 210 and finally from the charging interface 210 to the second battery pack. Due to the voltage difference between the first and the second battery packs, one of the first set of high-power diodes 221 associated to the second battery pack will be conductive while the other of the first set of high-power diodes 221 associated to the first battery pack will prevent the current to flow back into the first battery pack.

This can allow recharging of the second battery pack during the flight, subsequent to the second battery pack being used in a high power output demanding flight situation such as the take-off. Therefore, the second battery pack can be small, which can save space and weight. In addition, this can allow different battery packs for different flight situations that optimize the use of the battery packs.

This recharging mode can be extended and adapted to an arbitrary number of the battery packs 111. The activation switches 211 can allow an operator or a computer to select which of the battery packs 111 are to be charged or used to charge other of the battery packs 111.

In the bypass circuit 240, the bypass fuse 241 can prevent high currents from damaging the battery packs 111. Indeed, the connection of a discharged battery pack to be charged with another charged battery pack may induce a high current inrush that could damage the battery packs 111 or the more delicate circuitry such as cables and switches. The bypass fuse 241 therefore can act as a safety in case this current inrush is too high to be supported by the battery packs 111 or the circuitry. As mentioned before, the bypass resistor 243 serially connected with the bypass fuse 241 may be added as an additional safety in case of current inrushes.

As illustrated in FIG. 6b, the problem of high current inrush when charging a battery pack may be addressed by using one pre-charge circuit 230 associated to each respective battery packs and disposed between the connecting inputs 201 and the high-power diodes arrangement 220. This way, the current intensity at a connecting input 201 may be lowered by putting the corresponding pre-charge circuit 230 in its second configuration so that the intensity of the current flowing through the pre-charge circuit 230 to the battery pack is lowered by the resistor 233.

In another embodiment, a battery pack can also be charged by the motor 130 which is working as generator (the motor may also accordingly be referred to as a transducer). This can allow the recharging the battery pack during the flight or after the battery pack has been used in a high power output demanding flight situation. Therefore, the battery pack can be small, which can save space and weight. During flight periods, and especially during low-consuming flying phases such as for example the descending phase, one aircraft propeller, or even more, can be used to charge the battery packs 111. Indeed, a propeller can be used as a windmill to generate electrical energy that can be stored in the battery packs 111. Therefore, during flying phases in which the aircraft 100 does not require the totality of its propellers to be functional, the unused propellers can operate as windmills.

In the case where the motor 130 operates as a power generator, an electric connection between the motor controller 120 can be established through the bypass circuit 240 so as to allow a current to flow from the motor controller 120 to the battery pack. In a particular embodiment represented in FIG. 6b, the closing of the bypass switch 242 allows a current to flow from the connecting output 202 through the bypass circuit 240 to the charging interface 210 and then from the charging interface 210 to the battery packs 111 connected to the connecting input 201.

In the embodiment illustrated in FIG. 6a, the pre-charge circuit 230 can be used to prevent damaging the circuitry when recharging a discharged battery pack with the motor controller 120. Indeed, in this case, the difference of voltage between a discharged battery pack and the motor controller 120 may be of several hundred volts, leading to high inrush currents. In order to reduce the current intensity when charging a discharged battery pack with the motor controller 120, the pre-charge circuit 230 can be put in the second configuration described above so that the current flowing from the motor controller 120 has to flow through the resistor 233, which reduces its intensity. When the charging battery pack attains a certain voltage whose difference with the motor controller voltage is not problematic anymore, the pre-charge circuit 230 can be put in the first configuration described above so as to increase the current intensity flowing to the battery pack and accelerate its recharging. A timer may also be added so as to automatically switch the pre-charge circuit 230 from the second configuration to the first configuration to reduce the charging time.

In another embodiment, a battery pack connected to one of the connecting inputs 201 can be recharged using regenerative braking energy. The charging interface 210 of the coupling circuit 200 can be connected to a regenerative braking device that converts the kinetic energy of the aircraft 100 during a braking phase into electric current. This electric current is input in the coupling circuit 200 through the charging interface 210 and then flows through the first set of high-power diodes 221 associated to the battery pack and through eventual closing of the activation switches 211.

Braking energy during landing or sinking recovered by a generator motor can create high currents which may not be recovered by battery packs used for traveling long distances. This problem can be addressed by using a dedicated battery pack suitable for receiving high power output in a short time, so that more braking energy can be stored.

In one embodiment illustrated in FIG. 9, one or more of the battery packs 111 can be charged with a power source which can be external to the aircraft 100, such as for the charging station 212 when the aircraft 100 is at rest on the ground. The charging station 212 may be external to the aircraft 100.

The present disclosure also relates to a powering system 300 for powering an electric or hybrid aircraft. As illustrated in FIG. 7, the powering system 300 includes the motor controller 120 for controlling the motor 130 of the aircraft, the battery packs 111 connected in parallel to a coupling circuit which is itself connected to the motor controller 120. The coupling circuit comprises a charging interface 210 for charging the battery packs 111 and a high-power diodes arrangement 220 as described above.

The powering system 300 can include the pre-charge circuit 230, which can be disposed either between the high-power diodes arrangement 220 and the motor controller 120, or between each respective of the battery packs 111 and the high-power diodes arrangement 220. Alternatively or complementarily, the pre-charge circuit 230 can be placed inside the battery packs 111.

The pre-charge circuit 230 have the same purposes as explained above and allow for temporarily lowering of the current intensity to prevent high currents inrush from damaging the fragile circuitry.

The battery packs 111 may include battery packs with several different voltages according to the specific uses of the aircraft 100. In particular, the powering system 300 can include at least one take-off battery pack providing a high power during a short period of time and/or a cruising battery pack providing a lower power over a longer period of time.

The powering system 300 can include the motor controller 120 connected to the connecting output 202 of the coupling circuit 200. The motor controller 120 can be used to control the motor 130 as well as other motor components and other circuitry. During recharging phases in which the motor 130 operates as a power generator, the motor controller 120 may manage the current flow that transits from the motor 130 to a battery pack.

Although examples provided herein may be described in the context of an aircraft, such as an electric or hybrid aircraft, one or more features may further apply to other types of vehicles usable to transport passengers or goods. For example, the one or more futures can be used to enhance construction or operation of automobiles, trucks, boats, submarines, spacecraft, hovercrafts, or the like.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms).

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

What is claimed is:

1. A system which powers an aircraft, the system comprising:
 a hardware controller configured to control a transducer of the aircraft;

a plurality of battery packs configured to provide an output voltage to the hardware controller;

a charging interface configured to connect to the transducer to charge the plurality of battery packs;

a plurality of diodes electrically connected to the plurality of battery packs, the charging interface, and the hardware controller, the plurality of diodes comprising a first set of diodes and a second set of diodes, the first set of diodes being oriented to prevent electrical current flowing from the plurality of battery packs to the charging interface, the second set of diodes being oriented to prevent electrical current flowing from the hardware controller to the plurality of battery packs and the charging interface and allow electrical current to flow from the charging interface to the hardware controller; and a pre-charge circuit configured to selectively reduce an amount of electrical current flowing to the hardware controller.

2. The system of claim 1, wherein the pre-charge circuit comprises a first branch and a second branch in parallel with the first branch, the first branch comprising a first switch, the second branch comprising a second switch and a resistor serially connected with the second switch.

3. The system of claim 1, wherein the pre-charge circuit electrically connects the plurality of diodes with the hardware controller.

4. The system of claim 1, wherein the pre-charge circuit electrically connects the plurality of diodes with the plurality of battery packs.

5. The system of claim 1, further comprising an activation switch connected between the plurality of battery packs and the plurality of diodes, the activation switch being configured to electrically connect the plurality of battery packs to the plurality of diodes and electrically disconnect the plurality of battery packs from the plurality of diodes.

6. The system of claim 5, wherein the activation switch comprises a field effect transistor that is remotely controllable by an operator or a computer in the aircraft.

7. The system of claim 1, further comprising a bypass circuit, a bypass switch, and a bypass fuse, the bypass circuit electrically connecting the charging interface to the hardware controller, the bypass circuit being configured to allow electrical current to flow from the hardware controller to the charging interface.

8. The system of claim 7, wherein the bypass circuit comprises a bypass resistor serially connected with the bypass fuse.

9. The system of claim 7, wherein the bypass circuit is configured to allow electrical current to flow from the hardware controller to the plurality of battery packs so that the plurality of battery packs is charged from the hardware controller.

10. The system of claim 9, wherein the bypass circuit is configured to allow electrical current to flow from a first battery pack of the plurality of battery packs to a second battery pack of the plurality of battery packs so that the second battery pack is charged from the first battery pack.

11. The system of claim 1, wherein the plurality of diodes is configured to allow electrical current to flow from the charging interface to the plurality of battery packs so that the plurality of battery packs is charged by the transducer.

12. The system of claim 1, wherein the hardware controller is configured to control the transducer to propel the aircraft and cause the aircraft to fly.

13. The system of claim 1, wherein each diode of the plurality of diodes has a nominal current rating between 120 A and 300 A.

14. The system of claim 1, wherein the hardware controller is programmed to execute instructions to control the transducer.

15. A coupling circuit which powers an aircraft, the coupling circuit comprising:

a plurality of connecting inputs configured to connect to a plurality of battery packs;

a charging interface configured to connect to a transducer to charge the plurality of battery packs;

a connecting output configured to connect to a hardware controller, the hardware controller being configured control the transducer;

a plurality of diodes comprising a first set of diodes arranged in a common anode configuration and a second set of diodes arranged in a common cathode configuration; and a pre-charge circuit electrically connected to the plurality of diodes and configured to selectively reduce an amount of electrical current flowing to the hardware controller.

16. The coupling circuit of claim 15, wherein the pre-charge circuit comprises a first branch and a second branch in parallel with the first branch, the first branch comprising a first switch, the second branch comprising a second switch and a resistor serially connected with the second switch.

17. A method of powering the aircraft using the coupling circuit of claim 16, the method comprising:

during a pre-charge interval, powering the transducer through the second branch; and after the pre-charge interval, closing the first switch to power the transducer through the first branch.

18. The method of claim 17, further comprising preventing, by an electronic control circuit, said closing of the first switch before a predetermined delay or a sufficient pre-charge of capacitors of the hardware controller.

19. The method of claim 18, wherein said closing the first switch is triggered automatically by an electronic control circuit subsequent to a delay or responsive to detection of a sufficient pre-charge of input capacitors of the hardware controller.

20. The coupling circuit of claim 15, wherein the plurality of diodes comprise a first set of diodes and a second set of diodes, the first set of diodes being oriented to prevent electrical current flowing from the plurality of battery packs to the charging interface, the second set of diodes being oriented to prevent electrical current flowing from the hardware controller to the plurality of battery packs.

21. The coupling circuit of claim 20, wherein the pre-charge circuit electrically connects the plurality of diodes with the connecting output.

22. The coupling circuit of claim 20, wherein the pre-charge circuit electrically connects the plurality of diodes with the plurality of connecting inputs.

23. The coupling circuit of claim 20, further comprising an activation switch connected between the plurality of connecting inputs and the plurality of diodes, the activation switch being configured to electrically connect the plurality of battery packs to the plurality of diodes and electrically disconnect the plurality of battery packs from the plurality of diodes.

24. The coupling circuit of claim 23, wherein the activation switch comprises a field effect transistor that is remotely controllable by an operator or a computer in the aircraft.

25. The coupling circuit of claim 20, wherein the plurality of diodes is configured to allow electrical current to flow from the charging interface to the plurality of battery packs so that the plurality of battery packs is charged by the transducer.

26. The coupling circuit of claim 20, wherein the transducer is configured to propel an aircraft housing and cause the aircraft housing to fly.

27. The coupling circuit of claim 20, wherein each diode of the plurality of diodes has a nominal current rating between 50 A and 400 A.

28. The coupling circuit of claim 15, further comprising a bypass circuit, a bypass switch, and a bypass fuse, the bypass circuit electrically connecting the charging interface to the connecting output, the bypass circuit being configured to allow electrical current to flow from the connecting output to the charging interface.

29. The coupling circuit of claim 28, wherein the bypass circuit is configured to allow electrical current to flow from the connecting output to the plurality of battery packs so that the plurality of battery packs is charged from the hardware controller.

30. The coupling circuit of claim 28, wherein the bypass circuit is configured to allow electrical current to flow from a first connecting input of the plurality of connecting inputs to a second connecting input of the plurality of connecting inputs so that a second battery pack connected of the plurality of battery packs to the second connecting input is charged from a first battery pack of the plurality of battery packs connected to the first connecting input.

* * * * *